United States Patent
Grainger

(10) Patent No.: US 12,060,828 B1
(45) Date of Patent: Aug. 13, 2024

(54) TURBINE SYSTEM TO GENERATE ELECTRICITY FROM WASTE GAS, OVEN SYSTEM INCLUDING THE SAME, AND METHOD OF GENERATING ELECTRICITY FROM WASTE GAS

(71) Applicant: Stolle Machinery Company, LLC, Centennial, CO (US)

(72) Inventor: John Nigel Grainger, West Yorkshire (GB)

(73) Assignee: STOLLE MACHINERY COMPANY, LLC, Centennial, CO (US)

( * ) Notice: Subject to any disclaimer, the term of this patent is extended or adjusted under 35 U.S.C. 154(b) by 0 days.

(21) Appl. No.: 18/228,194

(22) Filed: Jul. 31, 2023

(51) Int. Cl.
*F02C 6/18* (2006.01)
*B21D 51/26* (2006.01)
*F02C 6/04* (2006.01)

(52) U.S. Cl.
CPC .............. *F02C 6/04* (2013.01); *B21D 51/26* (2013.01); *F02C 6/18* (2013.01); *F05D 2220/32* (2013.01); *F05D 2220/62* (2013.01); *F05D 2220/764* (2013.01); *F05D 2260/213* (2013.01)

(58) Field of Classification Search
CPC ...... F02C 7/32; F02C 7/08; F02C 7/04; F02C 6/18; F02C 6/08; F02C 1/06; F02C 7/18; F02C 7/185
See application file for complete search history.

(56) References Cited

U.S. PATENT DOCUMENTS

| | | | | |
|---|---|---|---|---|
| 5,305,616 | A * | 4/1994 | Coffinberry | F02C 7/18 62/402 |
| 7,389,644 | B1 * | 6/2008 | Nakhamkin | F02C 6/16 60/727 |
| 7,770,376 | B1 * | 8/2010 | Brostmeyer | F01K 23/10 60/39.182 |
| 10,024,195 | B2 * | 7/2018 | Watkins | F01K 5/00 |
| 10,385,735 | B2 * | 8/2019 | Stapp | F02C 1/007 |
| 10,563,581 | B2 * | 2/2020 | Scipio | F02C 7/08 |
| 2006/0225428 | A1 * | 10/2006 | Brostmeyer | F01K 23/103 60/39.464 |
| 2013/0340439 | A1 * | 12/2013 | Ekanayake | F02C 7/055 60/39.093 |
| 2015/0240713 | A1 * | 8/2015 | Kraft | F02C 3/10 60/774 |
| 2017/0335713 | A1 * | 11/2017 | Klemen | F02C 7/36 |
| 2019/0284966 | A1 * | 9/2019 | Harris | F01K 23/064 |

* cited by examiner

*Primary Examiner* — Thuyhang N Nguyen
(74) *Attorney, Agent, or Firm* — Eckert Seamans Cherin & Mellott, LLC

(57) ABSTRACT

A turbine system structured to generate electricity from waste gas includes a combustor structured to burn gas to heat air, a heat exchanger structured to receive the heated air, and a turbine energy conversion system including a compressor turbine structured to compress ambient air and provide the compressed air to the heat exchanger, wherein the heat exchanger is structured to heat the compressed air with the heated air, a generator turbine structured to be turned by the heated compressed air from the decompressor turbine, and a generator structured to be turned by the generator turbine and to generate electricity in response to being turned. The turbine system further includes a mixer structured to receive excess air from the heat exchanger and the generator turbine and to mix the excess air with ambient air to a desired temperature.

19 Claims, 3 Drawing Sheets

TURBINE SYSTEM TO GENERATE ELECTRICITY FROM WASTE GAS, OVEN SYSTEM INCLUDING THE SAME, AND METHOD OF GENERATING ELECTRICITY FROM WASTE GAS

FIELD OF THE INVENTION

The disclosed concept relates generally to can making, and more particularly to systems and methods for harvesting energy from can dryers or ovens.

BACKGROUND OF THE INVENTION

Part of the manufacturing process of metal beverage and food containers (e.g., cans) includes passing the cans through an oven to cure internal coatings and external ink and varnish. A schematic diagram of a typical oven system 10 is shown in FIG. 1.

The oven system 10 includes a direct fired gas burner 14 that is fed natural gas 16 and combustion air 18. The burner 14 burns natural gas 16 in a combustion chamber 12, which heats air flowing around the combustion chamber 12 to a desired temperature. Cool fresh air 20 may also be drawn into the combustion chamber 12 to balance pressures and adjust temperatures in the system.

The heated air is transported to an oven cavity 24 via a feed duct 22. A recirculation fan may be disposed along the feed duct to assist with transport of the heated air to the over cavity 24. Cans are transported through the over cavity 24 by a continuous conveyor 26. While passing through oven cavity, the can are subjected to the heated air, which cures internal coating and external ink and varnish on the cans. A portion of the heated air is exhausted, usually to atmosphere, via an exhaust duct 28. Another portion of the heated air is transported back to the combustion chamber 12 via a recirculation duct 30.

The process of generating the heated air is energy intensive. Additionally, the heated air that is exhausted results is waste of energy. Overall, the typical curing process can be energy intensive and wasteful. The is room for improvement in can oven systems.

SUMMARY OF THE INVENTION

According to an aspect of the disclosed concept, a turbine system structured to generate electricity from waste gas comprises a combustor structured to burn gas to heat air; a heat exchanger structured to receive the heated air from the combustor; a turbine energy conversion system including: a compressor turbine structured to compress ambient air and provide the compressed air to the heat exchanger, wherein the heat exchanger is structured to heat the compressed air with the heated air from the combustor; a decompressor turbine structured to be turned by the heated compressed air and to provide the heated compressed air to the generator turbine; a generator turbine structured to be turned by the heated compressed air from the decompressor turbine; and a generator structured to be turned by the generator turbine and to generate electricity in response to being turned; and a mixer structured to receive excess air from the heat exchanger and the generator turbine and to mix the excess air with ambient air to a desired temperature.

According to another aspect of the disclosed concept, an oven system for curing cans comprises: an oven cavity; a conveyor system structured to transport cans through the oven cavity; and a turbine system including: a combustor structured to burn gas to heat air; a heat exchanger structured to receive the heated air from the combustor; a turbine energy conversion system including: a compressor turbine structured to compress ambient air and provide the compressed air to the heat exchanger, wherein the heat exchanger is structured to heat the compressed air with the heated air from the combustor; a decompressor turbine structured to be turned by the heated compressed air and to provide the heated compressed air to the generator turbine; a generator turbine structured to be turned by the heated compressed air from the decompressor turbine; and a generator structured to be turned by the generator turbine and to generate electricity in response to being turned; and a mixer structured to receive excess air from the heat exchanger and the generator turbine, to mix the excess air with ambient air to a desired temperature, and to provide the air at the desired temperature to the oven cavity, wherein the oven cavity is structured to use the air at the desired temperature from the mixer to heat and cure cans transported through the oven cavity.

According to another aspect of the disclosed concept, a method of generating electricity from waste gas comprises: heating air with a combustor; compressing ambient air with a compressor turbine; heating the compressed air in a heat exchanger; using the heated compressed air to turn a decompressor turbine and a generator turbine; generating electricity with a generator coupled to the generator turbine; and mixing excess air from the heat exchanger and the generator turbine with ambient air to a desired temperature.

BRIEF DESCRIPTION OF THE DRAWINGS

A full understanding of the invention can be gained from the following description of the preferred embodiments when read in conjunction with the accompanying drawings in which.

DETAILED DESCRIPTION OF THE INVENTION

Figure 1:
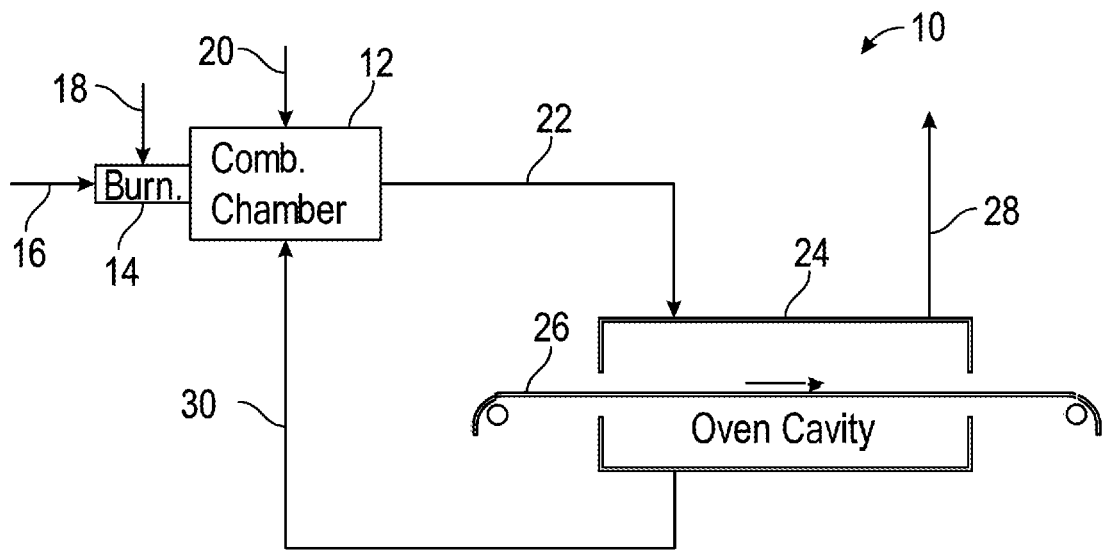
FIG. 1 is a schematic diagram of a typical oven system.

It will be appreciated that the specific elements illustrated in the figures herein and described in the following specification are simply exemplary embodiments of the disclosed concept, which are provided as non-limiting examples solely for the purpose of illustration. Therefore, specific dimensions, orientations, assembly, number of components used, embodiment configurations and other physical characteristics related to the embodiments disclosed herein are not to be considered limiting on the scope of the disclosed concept.

Directional phrases used herein, such as, for example, clockwise, counterclockwise, left, right, top, bottom, upwards, downwards and derivatives thereof, relate to the orientation of the elements shown in the drawings and are not limiting upon the claims unless expressly recited therein.

As used herein, the singular form of "a," "an," and "the" include plural references unless the context clearly dictates otherwise.

Figure 2:
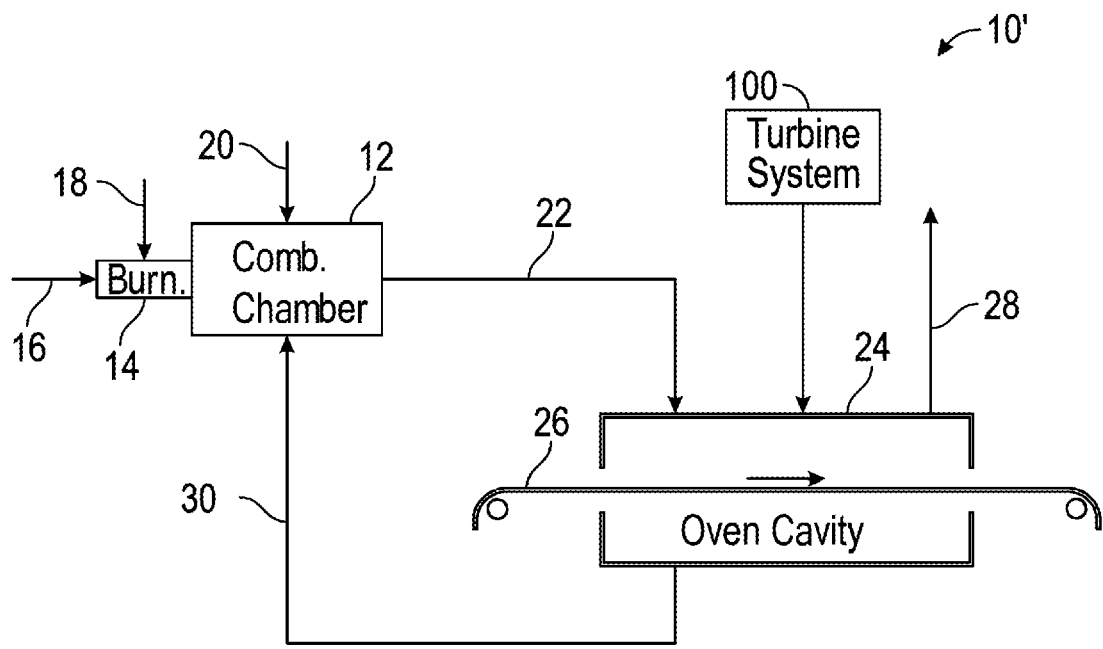
FIG. 2 is a schematic diagram of an oven system including a turbine system in accordance with an example embodiment of the disclosed concept.

FIG. 2 is a schematic diagram of a can oven system 10' in accordance with an example embodiment of the disclosed concept. The can oven system 10' includes a combustion chamber 12, burner 14, feed duct 22, oven cavity 24, continuous conveyor 26, exhaust duct 28, and recirculation duct 30 similar to the can oven system 10 discussed with respect to FIG. 1. For economy of disclosure, a repeated description of these elements is omitted. However, the can oven system 10' further includes a turbine system 100. The turbine system 100 is structured to provide an alternate source of heated air to the oven cavity 24. In some example embodiments, heated air is provided to the oven cavity 24 from the turbine system 100 instead of from the combustion chamber 12. In some example embodiments, when the turbine system 100 provides heated air to the oven cavity 24, the can oven system 10' is structured to turn off the burner 14 associated with the combustion chamber 12.

The turbine system 100 is structured to generate heated air in a more energy efficient manner than the burner 14 and combustion chamber 12. The turbine system 100, in some example embodiments, is structured to use the heated air to generate electricity before providing the heated air to the oven cavity 24.

Figure 3:
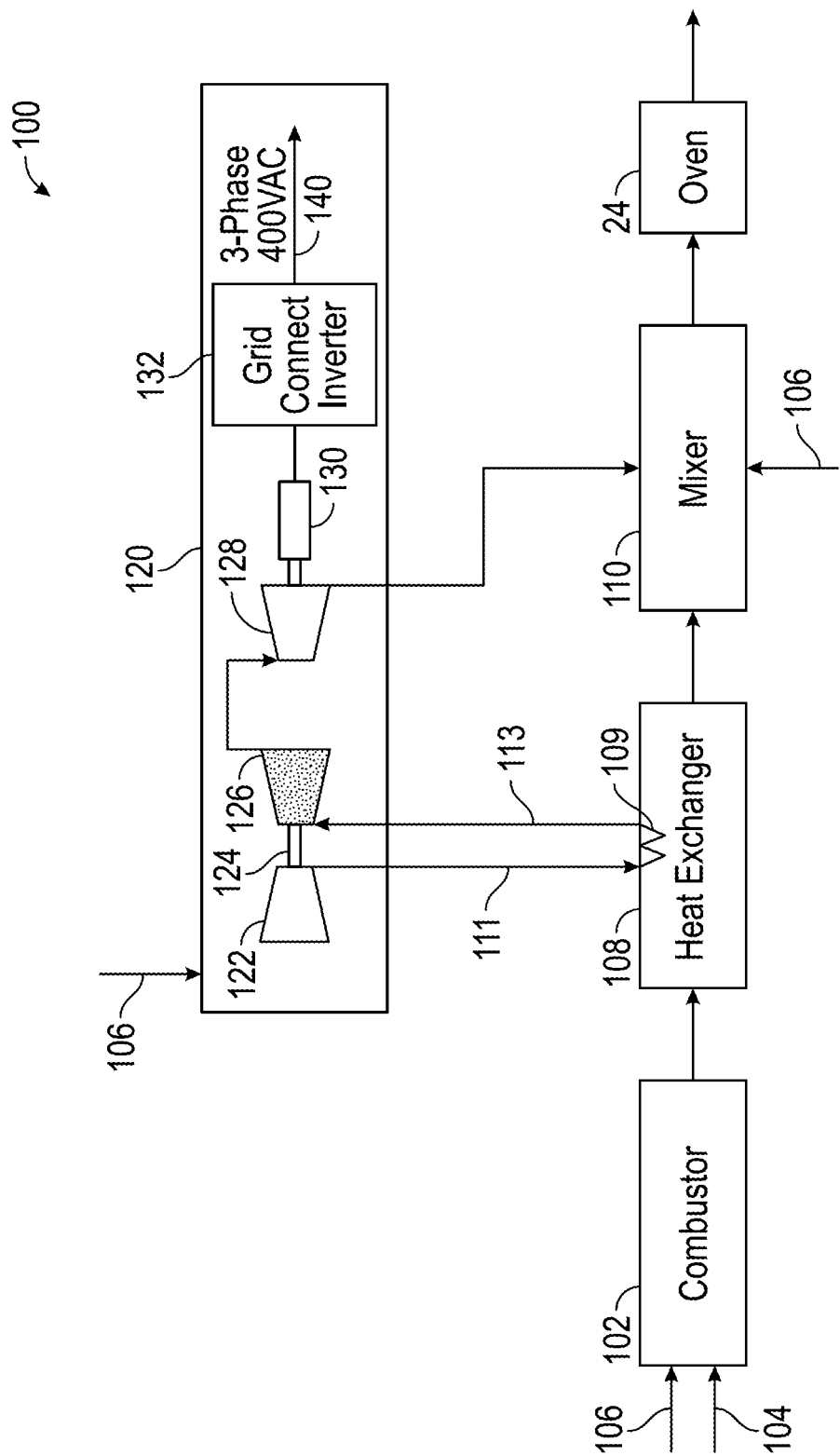
FIG. 3 is a schematic diagram of a turbine system in accordance with an example embodiment of the disclosed concept.

FIG. 3 is a schematic diagram of the turbine system 100 in accordance with an example embodiment of the disclosed concept. The turbine system 100 includes a combustor 102. The combustor 102 is fed by natural gas 104 and ambient air 106. The combustor 102 burns the natural gas to create heated air. In some example embodiments, the combustor 102 may be a thermal oxidizer. Heated air from the combustor 102 is provided to a heat exchanger 108. The heated air from the combustor 102, in some example embodiments, has a temperature between 750-1100° C.

The heat exchanger 108 receives compressed air via an input line 111 and outputs heated compressed air via an output line 113. The heat exchanger 108 includes a coil 109 that is coupled between the input and output lines 111,113. As the heated air in the heat exchanger 108 passes over the coil 109, the compressed air in the coil 109 is heated. In some example embodiments, the compressed air received through the input line is about 180° C. and about 4.5 bar-abs. In some example embodiments, the heated compressed air output through the output line 113 is about 680° C. The heat exchanger 108 outputs heated air through to a mixer 110. However, as a result of heating the compressed air via the coil 109, the heated air output by the heat exchanger 108 is cooler than the heated air received by the heat exchanger 108. In some example embodiments, the heated air output by the heat exchanger 108 is about 280° C.

The turbine system 100 further includes a turbine energy conversion system 120. The turbine energy conversion system 120 includes a compressor turbine 122 coupled to a decompressor turbine 126 by a shaft 124. The turbine energy conversion system 120 is structured to receive ambient air 106 and provide it to the compressor turbine 122. The compressor turbine 122 is structured to compress the exhaust and provide the compressed air to the heat exchanger 122 via the input line 122. To this extent, the compressor turbine 122 is coupled to the input line 111. As previously noted, the compressed air, in some example embodiments, is about 180° C. and 4.5 bar-abs. That is, in some example embodiments, the compressor turbine 122 is structured to compress the ambient air to about 4.5 bar-abs. As previously noted, the compressed air is heated by the heat exchanger 108. The decompressor turbine 126 is structured to receive the hot compressed air via the output line 113. The hot compressed air turns the decompressor turbine 126, which turns the compressor turbine 122 via the shaft 124.

The turbine energy conversion system 120 further includes generator turbine 128 coupled to and structured to turn a generator 130. The generator turbine 128 is structured to receive air from the decompressor turbine 126. The air received from the decompressor turbine 126 turns the generator turbine 128 which turns the generator 130. In some example embodiments, the air received from the decompressor turbine 128 is about 500° ° C. and 1.5 bar-abs. The generator 130 is structured to generate electricity by being turned. Thus, the air that turns the generator turbine 128 which turns the generator 130 and causes electricity to be generated.

Electricity generated by the generator 130 is provided to a inverter 132. The inverter 132 is structured to convert direct current electricity to alternating current electricity. The inverter 132 outputs alternating current electricity 140 that may then be used to serve any suitable electrical power needs. In some example embodiments, the alternating current electricity is 3-phase 400 VAC electricity.

The generator turbine 128 outputs air to the mixer 110. In some example embodiments, the generator turbine 128 outputs air that is about 400° ° C. As previously noted, the heat exchanger 108 also outputs air to the mixer 110. The mixer 110 is also structured to receive ambient air 106. The mixer 110 is structured to mix ambient air 106 with the air received from the heat exchanger 108 and the generator turbine 128 and to control the amount of ambient air received to achieve a desired air temperature and provide air at the desired temperature to the oven cavity 24. The air provided to the oven cavity 24 is provided in place of air provided from the combustion chamber 12 and serves the same purposes of heating the oven cavity 24 to cure the internal coatings and external ink and varnish on the cans. In some example embodiments, the mixer 110 provides air that is about 195-205° ° C. to the oven cavity 24.

In some example embodiments, air from the oven cavity 24 may be recirculated back to the combustor 102. The recirculation of air can further improve the efficiency of the turbine system 100.

The turbine system 100 provides more efficient heating of the oven cavity 24 by harvesting the energy of the heated air and converting it to electricity that can be applied toward any electrical power needs. This is more efficient than typical oven systems that would exhaust excess heated air.

In some example embodiments, the over system 10' may be configured to normally use the turbine system 100 to heat the oven cavity 24, and only activate the burner 14 when the turbine system 100 is unavailable. Thus, the turbine system 100 may be retroactively fitted to an existing oven system in order to increase efficiency of the oven system. In some example embodiments, the burner 14 and combustion chamber 12 may be omitted from the oven system 10' such that the turbine system 100 is the sole source of heat generation for the oven cavity 24.

Figure 4:
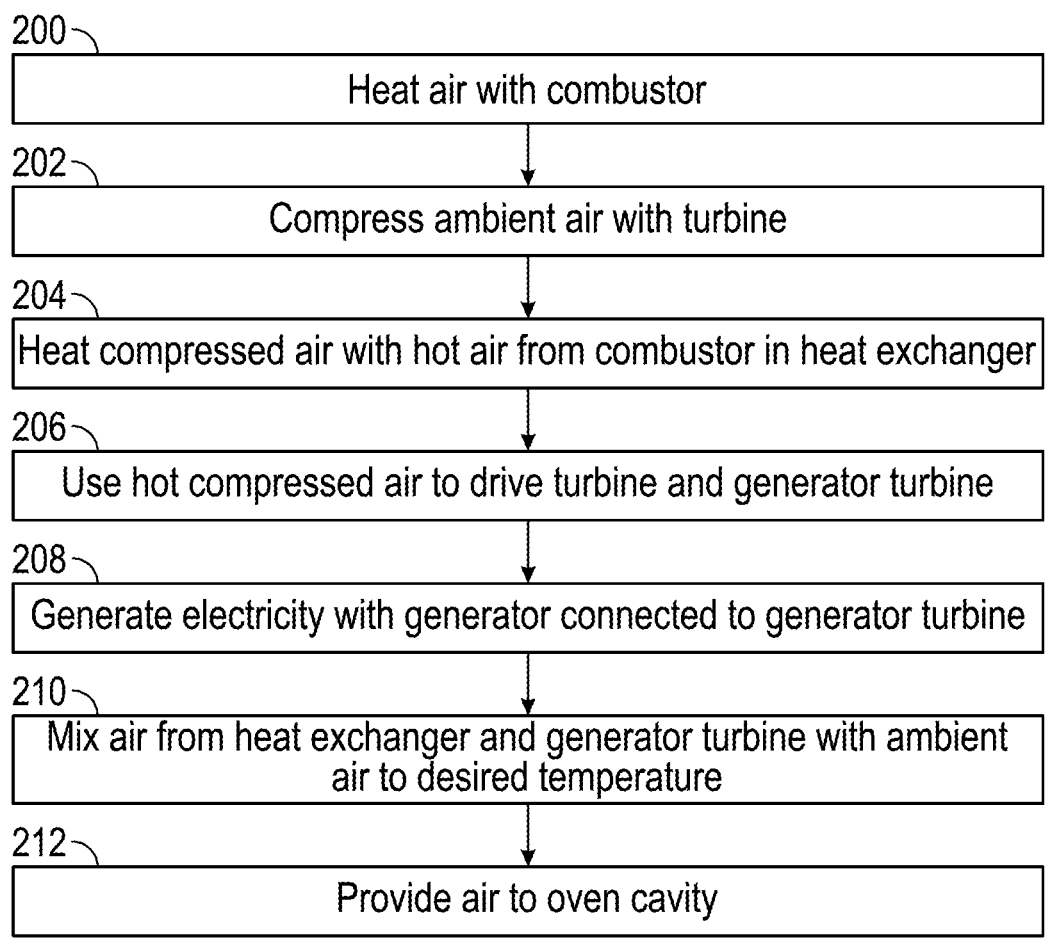
FIG. 4 is a flowchart of a method of harvesting energy from waste gas in accordance with an example embodiment of the disclosed concept.

FIG. 4 is a flowchart of a method of harvesting energy with a turbine system in accordance with an example embodiment of the disclosed concept. The method may be implemented, for example, with the turbine system 100.

The method begins at 200 by heating air with the combustor 200. At 202, ambient air 106 is compressed with the compressor turbine 122. At 204, the compressed air is heated in the heat exchanger 108 using the hot air from the combustor 102. At 206, the hot compressed air is used to drive the decompressor turbine 126 and subsequently drive the generator turbine 128. At 208, electricity is generated in the generator 130 connected to the generator turbine 128. At 210, excess air from the heat exchanger 108 and the generator turbine 128 is mixed with ambient air in the mixer 110 to a desired temperature. In some example embodiments, the desired temperature is about 195-205° C. At 212, the air from the mixer 110 is provided to the oven cavity 24 where it is used to cure cans.

While example embodiments of the disclosed concept have been described in relation to a can oven, it will be appreciated that the turbine system 100 may be applied to any application where a combustor or any other type of heater produces excess heated air or exhaust. Such excess heated air or exhaust can be provided to the turbine system 100 to produce harvest energy and generate electricity from the excess heat. Some additional applications in can manufacturing include heating systems for can dryers and can washers, and it will be appreciated that applying the turbine system in these and other applications is within the scope of the disclosed concept.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of disclosed concept which is to be given the full breadth of the claims appended and any and all equivalents thereof.

What is claimed is:

1. A turbine system structured to generate electricity from waste gas, the turbine system comprising:
    a combustor structured to burn gas to heat air;
    a heat exchanger structured to receive the heated air from the combustor;
    a turbine energy conversion system including:
        a compressor turbine structured to compress ambient air and provide the compressed air to the heat exchanger, wherein the heat exchanger is structured to heat the compressed air with the heated air from the combustor;
        a decompressor turbine structured to be turned by the heated compressed air;
        a generator turbine structured to be turned by the heated compressed air from the decompressor turbine; and
        a generator structured to be turned by the generator turbine and to generate electricity in response to being turned;
    a mixer structured to receive excess air from the heat exchanger and the generator turbine and to mix the excess air with ambient air to form a mixed air at a desired temperature, wherein the desired temperature is within a range of 195-205° C.; and
    an oven cavity to receive the mixed air to cure cans transported through the oven cavity.

2. The turbine system of claim 1, wherein the electricity generated by the generator is direct current electricity, and
    wherein the turbine energy conversion system further comprises:
        an inverter structured to convert the direct current electricity generated by the generator to alternating current electricity.

3. The turbine system of claim 1, wherein the alternating current electricity is 3-phase 400 VAC electricity.

4. The turbine system of claim 3, further comprising:
    an input line coupled between the compressor turbine and the heat exchanger and structured to provide the compressed air to the heat exchanger;
    an output line coupled between the heat exchanger and the decompressor turbine and structured to provide the heated compressed air to the decompressor turbine; and
    a coil disposed in the heat exchange and coupled between the input line and the output line,
    wherein heated air in the heat exchanger passing over the coil causes the compressed air to become heated compressed air.

5. The turbine system of claim 4, wherein the compressed air has a temperature of 180° C. and the heated compressed air has a temperature of about 680° C.

6. The turbine system of claim 1, wherein the turbine energy conversion system further comprises:
    a shaft coupled between the compressor turbine and the decompressor turbine,
    wherein turning the decompressor turbine causes the shaft and the compressor turbine to turn.

7. The turbine system of claim 1, wherein excess air output from the heat exchanger to the mixer has a lower temperature than heated air from the combustor received in the heat exchanger.

8. The turbine system of claim 1, wherein the heated air from the combustor received in the heat exchanger has a temperature in a range of 750-1100° C.

9. An oven system for curing cans, the oven system comprising:
    an oven cavity;
    a conveyor system structured to transport cans through the oven cavity; and
    a turbine system including:
        a combustor structured to burn gas to heat air;
        a heat exchanger structured to receive the heated air from the combustor;
        a turbine energy conversion system including:
            a compressor turbine structured to compress ambient air and provide the compressed air to the heat exchanger, wherein the heat exchanger is structured to heat the compressed air with the heated air from the combustor;
            a decompressor turbine structured to be turned by the heated compressed air;
            a generator turbine structured to be turned by the heated compressed air from the decompressor turbine; and
            a generator structured to be turned by the generator turbine and to generate electricity in response to being turned; and
        a mixer structured to receive excess air from the heat exchanger and the generator turbine, to mix the excess air with ambient air to a desired temperature to form a mixed air at the desired temperature, and to provide the mixed air at the desired temperature to the oven cavity,
    wherein the oven cavity is structured to use the mixed air at the desired temperature from the mixer to heat and cure cans transported through the oven cavity.

10. The oven system of claim 9, wherein the electricity generated by the generator is direct current electricity, and
    wherein the turbine energy conversion system further comprises:
        an inverter structured to convert the direct current electricity generated by the generator to alternating current electricity.

11. The oven system of claim 10, wherein the alternating current electricity is 3-phase 400 VAC electricity.

12. The oven system of claim 9, wherein the turbine system further comprises:

an input line coupled between the compressor turbine and the heat exchanger and structured to provide the compressed air to the heat exchanger;

an output line coupled between the heat exchanger and the decompressor turbine and structured to provide the heated compressed air to the decompressor turbine; and a coil disposed in the heat exchange and coupled between the input line and the output line, wherein heated air in the heat exchanger passing over the coil causes the compressed air to become heated compressed air.

13. The oven system of claim 12, wherein the compressed air has a temperature of 180° C. and the heated compressed air has a temperature of about 680° C.

14. The oven system of claim 10, wherein the turbine energy conversion system further comprises:

a shaft coupled between the compressor turbine and the decompressor turbine, wherein turning the decompressor turbine causes the shaft and the compressor turbine to turn.

15. The oven system of claim 9, wherein the desired temperature is within a range of 195-205° C.

16. The oven system of claim 9, wherein excess air output from the heat exchanger to the mixer has a lower temperature than heated air from the combustor received in the heat exchanger.

17. The oven system of claim 9, wherein the heated air from the combustor received in the heat exchanger has a temperature in a range of 750-1100° C.

18. The oven system of claim 9, further comprising:

a combustion chamber;

a burner structured to burn gas is the combustion chamber; and a feed duct structured to provide heated air from the combustion chamber to the oven cavity, wherein the oven system is structured to turn off the burner when the turbine system is operating.

19. A method of generating electricity from waste gas, the method comprising:

heating air with a combustor;

compressing ambient air with a compressor turbine;

heating the compressed air in a heat exchanger;

using the heated compressed air to turn a decompressor turbine and a generator turbine;

generating electricity with a generator coupled to the generator turbine; and mixing excess air from the heat exchanger and the generator turbine with ambient air to a desired temperature to form a mixed air at the desired temperature; and providing the mixed air to an oven cavity structured to use the mixed air at the desired temperature from the mixer to heat and cure cans transported through the oven cavity.

* * * * *